(12) United States Patent
Vollmar et al.

(10) Patent No.: US 7,200,774 B2
(45) Date of Patent: Apr. 3, 2007

(54) SYSTEM AND METHOD FOR SUPPORTING A FAULT CAUSE ANALYSIS

(75) Inventors: Gerhard Vollmar, Meckenheim (DE); Zaijun Hu, Ludwigshafen (DE); Jari Kallela, Espoo (FI); Manuel Greulich, Oberwolfach (DE)

(73) Assignee: ABB Research Ltd, Zürich (CH)

( * ) Notice: Subject to any disclaimer, the term of this patent is extended or adjusted under 35 U.S.C. 154(b) by 530 days.

(21) Appl. No.: 10/349,394

(22) Filed: Jan. 22, 2003

(65) Prior Publication Data

US 2003/0135786 A1   Jul. 17, 2003

Related U.S. Application Data

(63) Continuation of application No. PCT/EP00/07058, filed on Jul. 22, 2000.

(51) Int. Cl.
*G06F 11/00* (2006.01)

(52) U.S. Cl. .................................................. 714/26
(58) Field of Classification Search ................... 714/26
See application file for complete search history.

(56) References Cited

U.S. PATENT DOCUMENTS

| | | | |
|---|---|---|---|
| 5,127,005 A | | 6/1992 | Oda et al. |
| 5,187,773 A | * | 2/1993 | Hamilton et al. ............. 706/52 |
| 5,305,426 A | * | 4/1994 | Ushioda et al. ............... 706/52 |
| 5,369,756 A | * | 11/1994 | Imura et al. ................... 714/26 |
| 5,412,756 A | * | 5/1995 | Bauman et al. ............... 706/45 |

(Continued)

FOREIGN PATENT DOCUMENTS

EP      0 377 736      7/1990

(Continued)

OTHER PUBLICATIONS

Juričić, D. et al.: "Generation of Fault Trees by Means of Simplified Process Models and Machine Learning", IFAC Artificial Intelligence in Real-Time, Slovenia, Nov. 29, 1995, pp. 31-36.

(Continued)

*Primary Examiner*—Robert Beausoliel
*Assistant Examiner*—Elmira Mehrmanesh
(74) *Attorney, Agent, or Firm*—Laurence A. Greenberg; Werner H. Stemer; Ralph E. Locher (57) ABSTRACT

A system and method for supporting a fault cause analysis in a afault event in a plant includes a data processor with memory storing a fault model of XML files accessed by a fault cause navigator and an operating/display device. Each fault model contains an industry-specific process model divided into process steps, with steps and defined fault events needed therefor assigned to plant components/systems, and fault trees assigned to fault events and having fault hypotheses. A checklist with symptoms for verification of the fault hypothesis is assigned to the fault hypotheses. The system enables navigation to the relevant step in the process model by the display and navigator, and presents a fault event list. Following fault event selection, critical components/systems corresponding thereto are found and displayed. Possible symptoms are generated and displayed in a checklist and hypotheses of possible fault causes, contained in the fault trees, are found and displayed.

9 Claims, 7 Drawing Sheets

U.S. PATENT DOCUMENTS

| | | | |
|---|---|---|---|
| 5,420,977 A * | 5/1995 | Sztipanovits et al. | 715/853 |
| 5,428,619 A * | 6/1995 | Schwartz et al. | 714/712 |
| 5,914,875 A * | 6/1999 | Monta et al. | 700/79 |
| 5,922,079 A * | 7/1999 | Booth et al. | 714/26 |
| 6,635,089 B1 * | 10/2003 | Burkett et al. | 715/513 |
| 6,675,353 B1 * | 1/2004 | Friedman | 715/513 |
| 6,687,897 B2 * | 2/2004 | Guinart | 717/143 |
| 6,725,426 B1 * | 4/2004 | Pavlov | 715/523 |
| 6,912,671 B2 * | 6/2005 | Christensen et al. | 714/25 |
| 6,915,456 B2 * | 7/2005 | Banerjee et al. | 714/39 |
| 6,985,889 B1 * | 1/2006 | Tapio et al. | 706/45 |
| 2002/0002560 A1 * | 1/2002 | Shah et al. | 707/200 |
| 2003/0097617 A1 * | 5/2003 | Goeller et al. | 714/39 |
| 2004/0205565 A1 * | 10/2004 | Gupta | 715/513 |

FOREIGN PATENT DOCUMENTS

| | | |
|---|---|---|
| EP | 0 482 523 A2 | 4/1992 |

OTHER PUBLICATIONS

John Moubray: "Reliability-centred Maintenance", *Butterworth-Heinemann, Oxford*, $2^{nd}$ *ed.*, 1997.

* cited by examiner

Fault hypothesis - Fault in the cleaning plant

Description: ...

Component/system: Cleaning plant

Check list

Indentations in the steel plate?
Diagnostic effort: low

Black spots on the steel plate?
Diagnostic effort: low

Imprint on the working roll?
Diagnostic effort: medium

Fault tree reference
Cleaning plant

SYSTEM AND METHOD FOR SUPPORTING A FAULT CAUSE ANALYSIS

CROSS-REFERENCE TO RELATED APPLICATION

This is a continuing application, under 35 U.S.C. § 120, of copending International Application No. PCT/EP00/07058 filed Jul. 22, 2000, which designated the United States.

BACKGROUND OF THE INVENTION

Field of the Invention

The invention relates to a system and method for supporting a fault cause analysis in the case of a fault event in an industrial plant.

To assist the service personnel when looking for the cause for a fault event that has occurred in the operation of a technical plant, fault models can be drawn up and used for the fault analysis. The structure of such fault models is also referred to as a fault tree.

Models for fault cause analysis can be developed in accordance with different existing methods and techniques, such as Failure Modes and Effects Analysis (FMEA), or fault tree analysis [John Moubray, RCM2, Butterworth-Heinemann, Second Edition 1997]. However, the results of a fault cause analysis using such models are often inadequately documented, if at all in electronic form, and, then, normally as EXCEL tables or as graphics in Power Point. In addition, it is a disadvantage that only the results of the analytical process are documented. The use of the results for the analysis of fault causes in similar problem cases is only inadequately supported. To make existing experience accessible for reuse, it would be necessary for these tools to support model libraries with search functions. However, current search machines implement only a search for texts. Convenient tools at any rate permit linking with Boolean operators. Nevertheless, search queries also supply unsatisfactory results in this case. The list of hits is often very comprehensive or potential hits are not recognized because the pure text comparison supplies a negative result.

SUMMARY OF THE INVENTION

It is accordingly an object of the invention to provide a system and method for supporting a fault cause analysis that overcomes the hereinafore-mentioned disadvantages of the heretofore-known devices and methods of this general type and that provides improved support for fault cause analysis.

With the foregoing and other objects in view, there is provided, in accordance with the invention, a system for supporting a fault cause analysis of a fault event in an industrial plant having plant components and plant systems, including an operating and display device for receiving input data and displaying output data, a fault cause navigator, a data processing device having a fault model memory storing at least one hierarchically structured cause/effect model in XML files, the at least one cause/effect model having an industry-specific process model divided into process steps, respective ones of the process steps and defined fault events for the process steps being associated with one of the plant components and the plant systems, fault trees associated with the fault events having fault hypotheses, and a checklist with symptoms for verification of each of the fault hypotheses associated with a respective one of the fault hypotheses, the operating and display device and the fault cause navigator connected to the fault model memory and accessing the at least one cause/effect model, and the operating and display device, the fault cause navigator, and the data processing device programmed (a) to enable user navigation to a relevant one of the process steps in the at least one cause/effect model through the operating and display device and the fault cause navigator, and to present to a user a fault event list, (b) after selection of a fault event in the fault event list by the user, to find and display critical ones of the plant components and the plant systems corresponding to the selected fault event, (c) after selection of at least one of the critical plant components and the critical plant systems, to generate possible symptoms and display the symptoms in a checklist, and (d) after selection of at least one of the symptoms as a probable symptom, to find and display hypotheses of possible fault causes contained in the fault trees.

In accordance with another feature of the invention, the operating and display device, the fault cause navigator, and the data processing device are programmed, after displaying the hypotheses of possible fault causes contained in the fault trees, to one of enable user confirmation of one of the displayed hypotheses as an actual fault cause and mark a fact that none of the displayed hypotheses has been confirmed by the user and, if a hypothesis is confirmed as relevant, to generate and output a fault path, and, if no hypothesis is confirmed as relevant, to repeat steps b), c), and d) by finding and displaying other ones of the hypotheses in respective lower levels of at least one cause/effect model and respectively enable user confirmation of one of the displayed hypotheses as an actual fault cause.

In accordance with a further feature of the invention, there is provided a web server administering the XML files and a web browser, the data processing device with the fault model memory being part of the web server, the operating and display device and the fault cause navigator being a web client by which a user accesses the at least one cause/effect model through the web browser and the fault cause navigator.

With the objects of the invention in view, there is also provided a method for supporting a fault cause analysis of a fault event in an industrial plant having plant components and plant systems, including the steps of providing a data processing device with a fault model memory, storing in the fault model memory at least one hierarchically structured cause/effect model in the form of XML files, the at least one cause/effect model having an industry-specific process model divided into process steps, respective ones of the process steps and defined fault events for the process steps being associated with one of the plant components and the plant systems, fault trees associated with the fault events, the fault trees having fault hypotheses, and a checklist with symptoms for verification of each of the fault hypotheses associated with a respective one of the fault hypotheses, accessing the at least one cause/effect model through a fault cause navigator and an operating and display device, navigating, by a user, to a relevant one of the process steps in the at least one cause/effect model in a first search step through the operating and display device and the fault cause navigator, and presenting the user with a fault event list, in a second search step following selection of a fault event in the fault event list by the user, finding and displaying critical ones of the plant components and the plant systems corresponding to the selected fault event, in a third search step following selection of at least one of the critical plant components and plant systems, generating possible symptoms and displaying the possible symptoms in a checklist, and in a fourth step following selection of at least one of the symptoms as a probable symptom, finding and displaying hypotheses of possible fault causes, the hypotheses contained in the fault trees.

In accordance with an added mode of the invention, there is provided the step of enabling the user, in a query step following the fourth step, one of to confirm one of the displayed hypotheses as an actual fault cause and to mark a fact that none of the hypotheses has been confirmed, and if a hypothesis is confirmed as relevant, generating and outputting a fault path, and, if no hypothesis is confirmed as relevant, performing a repetition of the second to fourth steps to find and display other hypotheses in respective lower levels of at least one cause/effect model and in each case to connect the other hypotheses to the query step.

In accordance with an additional mode of the invention, there are provided the steps of providing the data processing device with the fault model memory as part of a web server, administering the XML files with the web server, configuring the operating and display device and the fault cause navigator as a web client, and accessing, through the web client, the at least one cause/effect model through a web browser and the navigator.

With the objects of the invention in view, there is also provided a method for supporting a fault cause analysis of a fault event in an industrial plant having plant components and plant systems, including the steps of providing a data processing device with a fault model memory, storing in the fault model memory at least one hierarchically structured cause/effect model in the form of XML files, the at least one cause/effect model having an industry-specific process model divided into process steps, respective ones of the process steps and defined fault events for the process steps being associated with one of the plant components and the plant systems, fault trees associated with the fault events, the fault trees having fault hypotheses, and a checklist with symptoms for verification of each of the fault hypotheses associated with a respective one of the fault hypotheses, accessing the at least one cause/effect model through a fault cause navigator and an operating and display device, navigating, by a user, to a relevant one of the process steps in the at least one cause/effect model through the operating and display device and the fault cause navigator, and presenting the user with a fault event list, finding and displaying critical ones of the plant components and the plant systems corresponding to the selected fault event, generating possible symptoms and displaying the possible symptoms in a checklist, and finding and displaying hypotheses of possible fault causes, the hypotheses contained in the fault trees.

The system according to the invention permits the searching and focusing in hierarchically structured XML-based cause/effect models. Working with the system makes it easier to find the suitable model for a given problem description and to come as close as possible to the actual fault cause in the model.

The implementation according to the invention of the models for the fault cause analysis in XML permits flexible and deep structuring of information. The XML data structures are selected such that rapid access to the necessary information contents is made possible. For such a purpose, the models are subdivided into categories and a stored process and component hierarchy is projected onto the models. Furthermore, fault effects are categorized and are described in a standardized way. To evaluate search queries, use is made of a method that expands a search method existing in the literature, for example, cosine retrieval [G. SALTON, The SMART Retrieval System—Experiment in Automatic Document Processing, Prentice-Hall, Englewood Cliffs, N.J., 1971] by the systematic use of application-specific information structures, such as model category, process and component hierarchy, and fault effect categories.

Other features that are considered as characteristic for the invention are set forth in the appended claims.

Although the invention is illustrated and described herein as embodied in a system for supporting a fault cause analysis, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

The system proposed can be implemented and used locally in a computer. However, an implementation in the Internet is preferred because, then, worldwide utilization for service purposes is readily possible.

Figure 1:
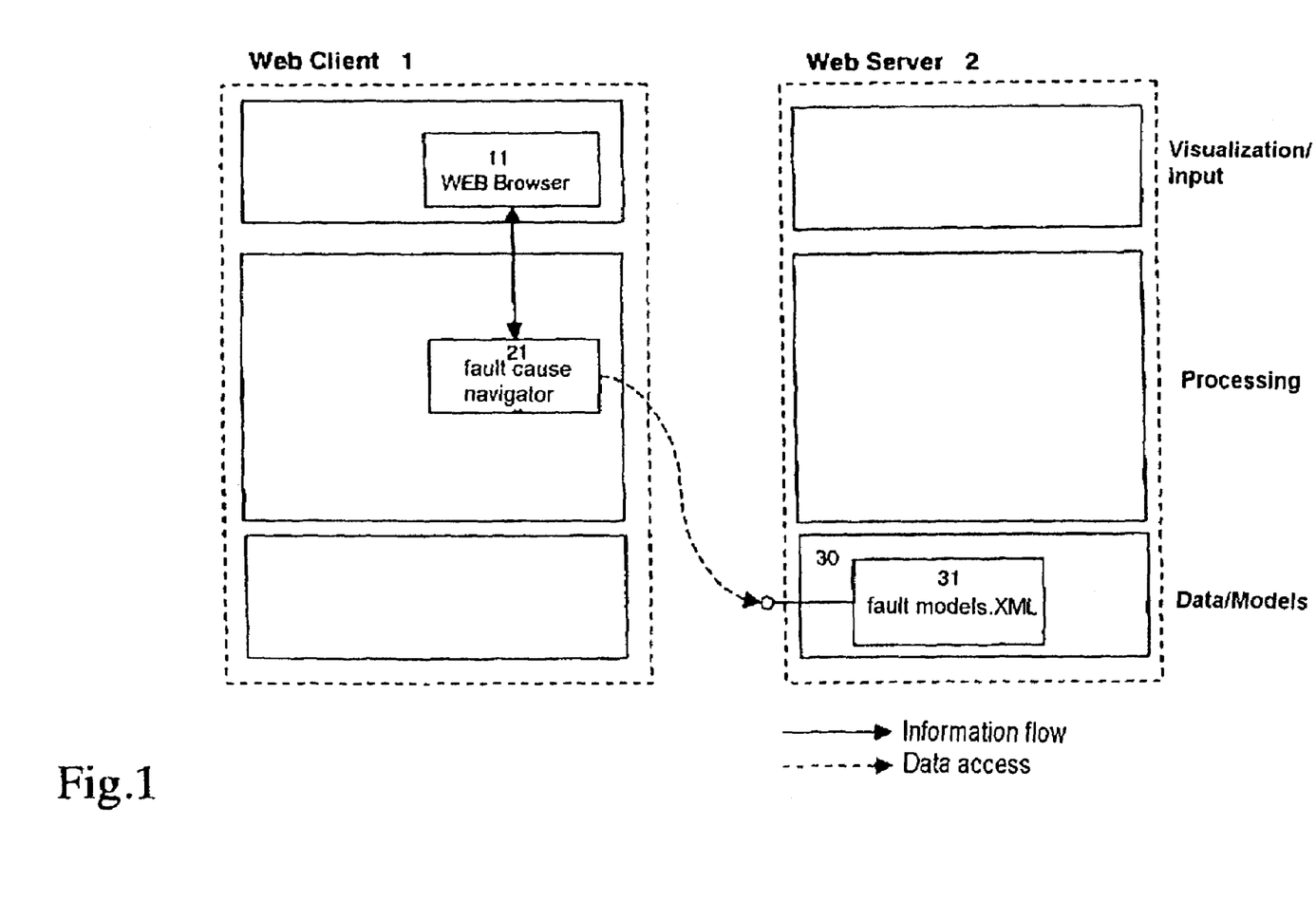
FIG. 1 is a block circuit diagram of a system according to the invention for supporting a fault cause analysis.

Referring now to the figures of the drawings in detail and first, particularly to FIG. 1 thereof, there is shown the system for fault cause analysis, having two system components web client 1 and web server 2. Fault models are stored as XML files in a fault model memory 31 in the web server 2 and are administered by its data processing device 30. A user has access to the models through an operating and display device 11 with a web browser, and, also, a fault cause navigator 21 of the web client 1. The fault cause navigator 21 operates on the basis of the method explained with regard to FIG. 2.

Figure 2:
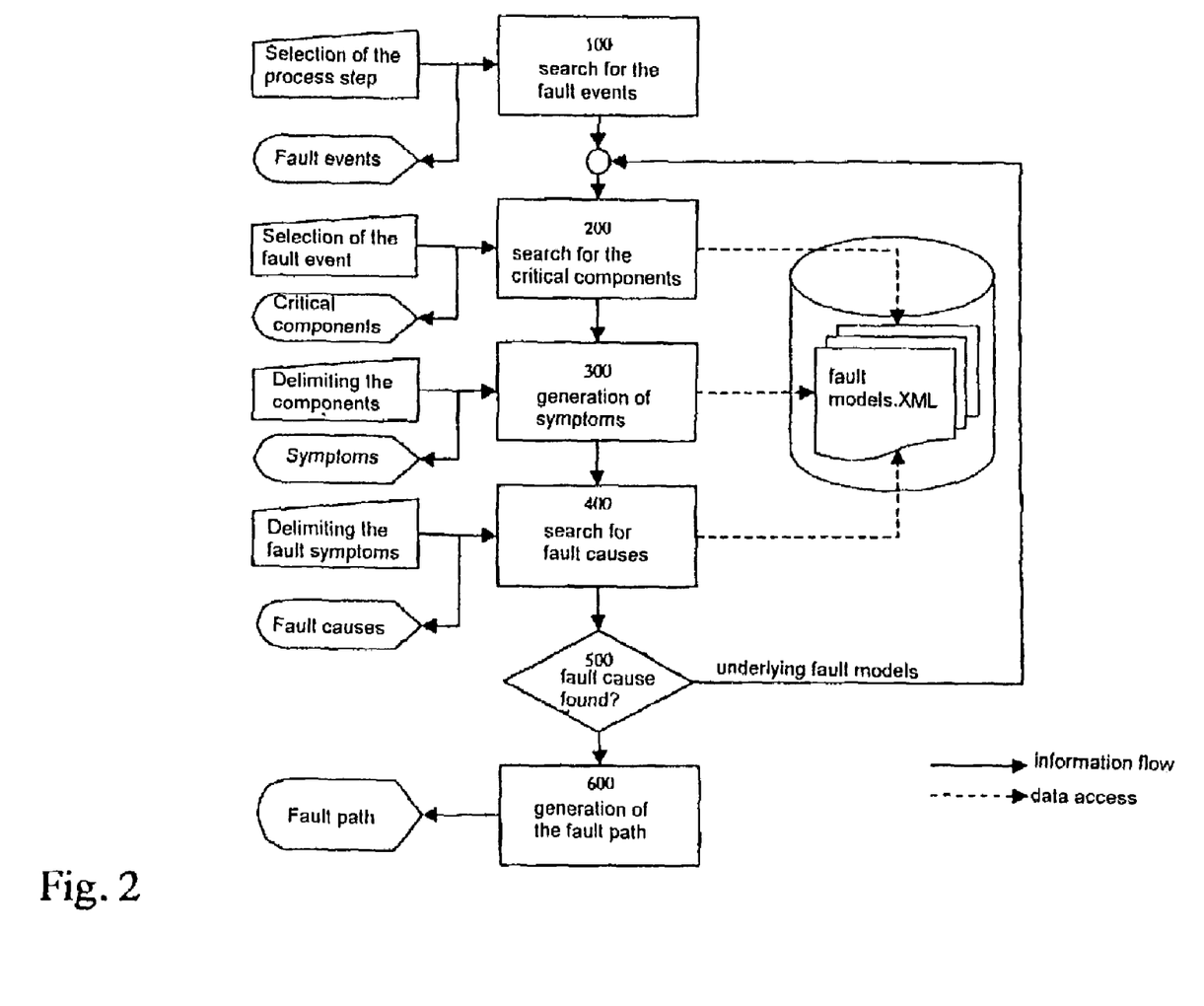
FIG. 2 is a flow chart representing an exemplary embodiment of the way in which the system according to the invention functions.

FIG. 2 shows a flow chart for the method for searching and focusing in XML-based models for fault cause analysis. Before the search begins, in a first step 100, the user has to navigate to the relevant process step in a stored fault model (cf. FIG. 3) through the web browser interface of the operating and display device 11. The user is, then, presented with a list with events that can occur in the selected process step.

The user selects the relevant fault event. In a second search step 200, the system searches for the critical plant components or plant systems corresponding to this event and displays them. A fault event in each case corresponds to the top node of a fault tree (cf. FIGS. 3 and 6). The following levels of the fault tree describe fault hypotheses. The contents of a fault hypothesis can be seen by using the example "fault in a cleaning plant" in FIG. 5. In step 200, therefore, to support the fault cause analysis further, components or plant systems from the first level of the fault hypotheses relating to each hypothesis (FIG. 5) are collected and are visualized for the user in a form prepared as critical components.

Before focusing is continued in a third step 300, the user delimits the possible fault candidates by using the displayed list. In step 300, the quantity of fault hypotheses delimited in this way is investigated further by the system. For such a purpose, the navigator 21 searches each associated checklist (cf. FIG. 5) for obvious symptoms. Obvious symptoms are all those whose diagnostic effort is low. All the symptoms that come into question are, then, made available to the user to select. The user can, then, select the symptoms that manifest themselves in the specific case.

In a fourth step 400, by using the present symptom selection, a search is made for the most probable fault cause in all the hypotheses and at least one fault hypothesis is displayed to the user as a probable fault cause.

In a query step 500, the user can confirm that a probable fault cause displayed by the system and possibly selected by the user is relevant. Then, in a further step 600, the system generates a fault path corresponding to the fault cause and displays this path.

If the reply given by the user to the query 500 is that none of the fault causes found is relevant, then, the second to fourth steps (200 to 400) are run through again, in each case lower levels of the hierarchical fault/effect models being looked through.

Figure 3:
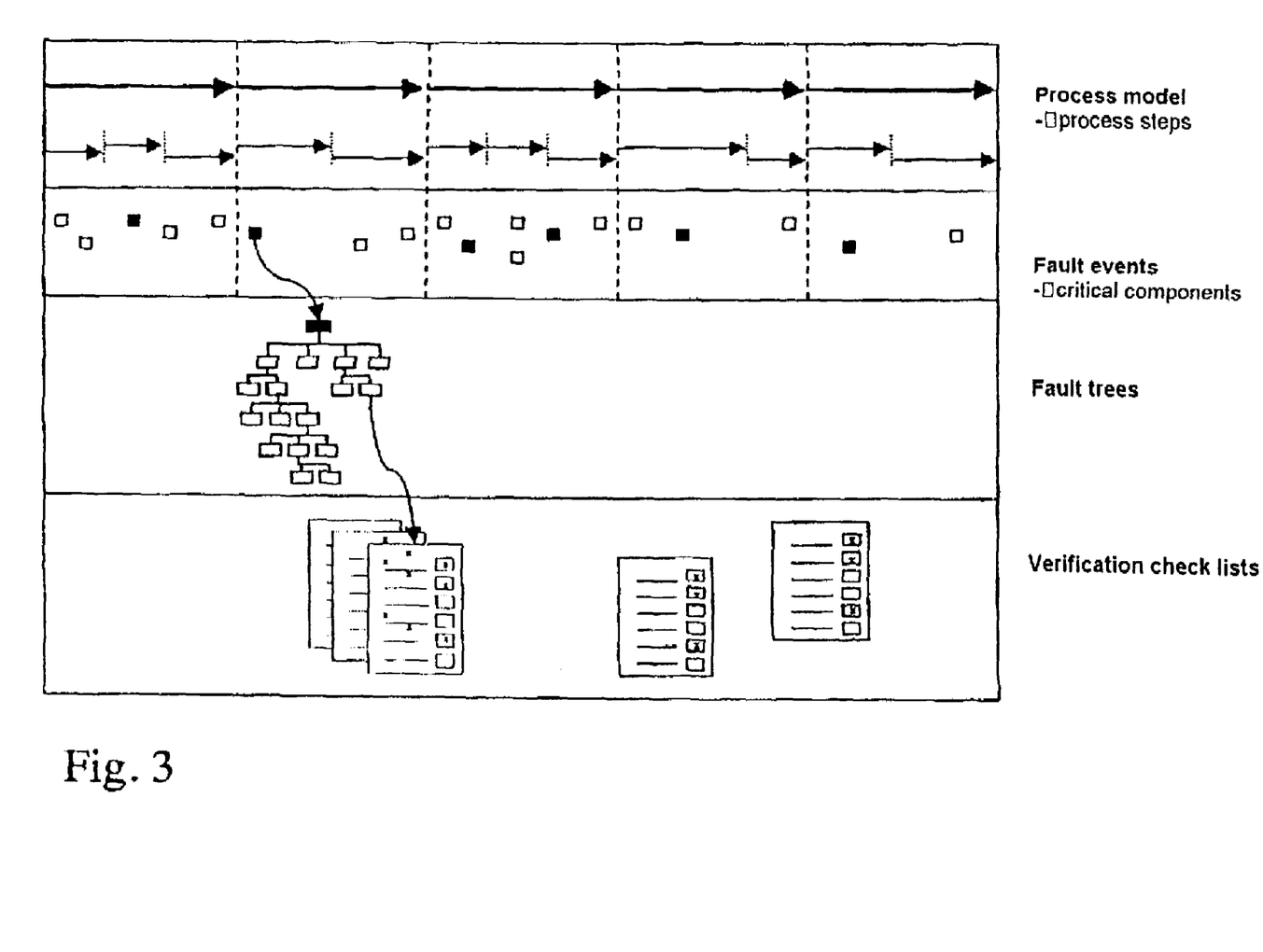
FIG. 3 is a diagrammatic illustration of a basic representation of a fault model according to the invention.

FIG. 3 shows the basic representation of a fault model. The top level contains a process model having a plurality of process steps. Each process step can be subdivided into further process steps. In relation to each process step there are fault events and critical components.

The next lower level in the model contains fault trees. Fault trees are categorized, as can be seen in FIG. 4.

A fault tree can be composed of a plurality of partial trees. This is indicated in FIG. 4 by the arrows and explained in more detail using FIG. 6.

The nodes of a fault tree represent fault hypotheses. An important part of the content of a fault hypothesis is a checklist relating to verification. The contents of a hypothesis will be explained in more detail in FIG. 5.

Figure 4:
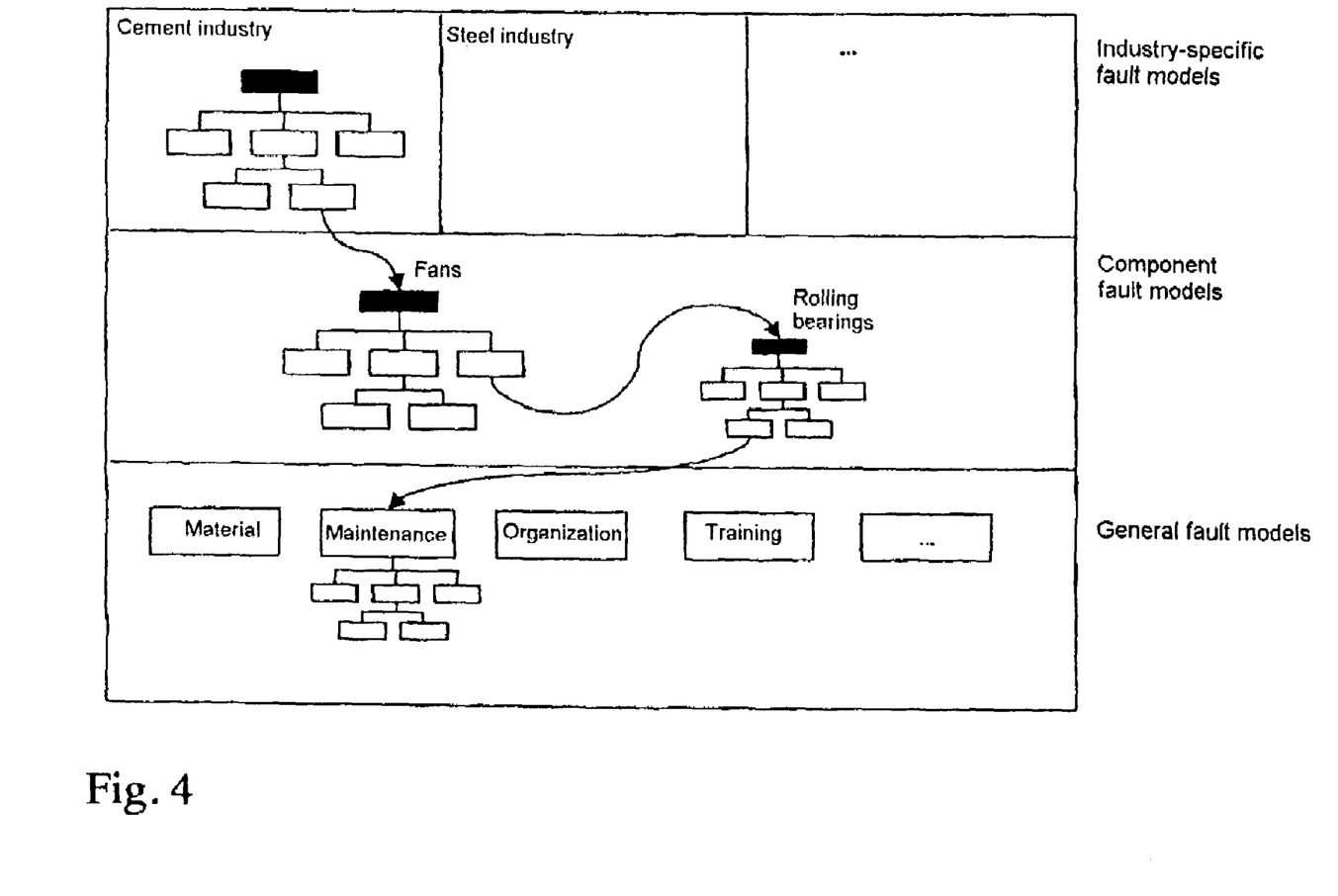
FIG. 4 is a diagrammatic illustration of a representation relating to categorization of the fault models.

FIG. 4 shows the categorization of the fault models. The industry-specific fault models set up for the purpose are in each case typical of a specific industry, such as fault models for the cement industry or fault models for the steel industry. This category of fault models has the fault event as the top node. A fault event is an undesired state that impairs production.

A second category according to FIG. 4 describes component faults. These models are generally applicable and, therefore, can be applied in different industries. Typically, hypotheses from the industry-specific fault models refer to component fault models.

The third category of fault models describes very generally applicable fault relationships. Such faults have their causes, for example, in inadequate training of the employees, or organizational states of affairs or problems in maintenance. These models are placed below the industry-specific fault models and the component fault models.

Figure 5:
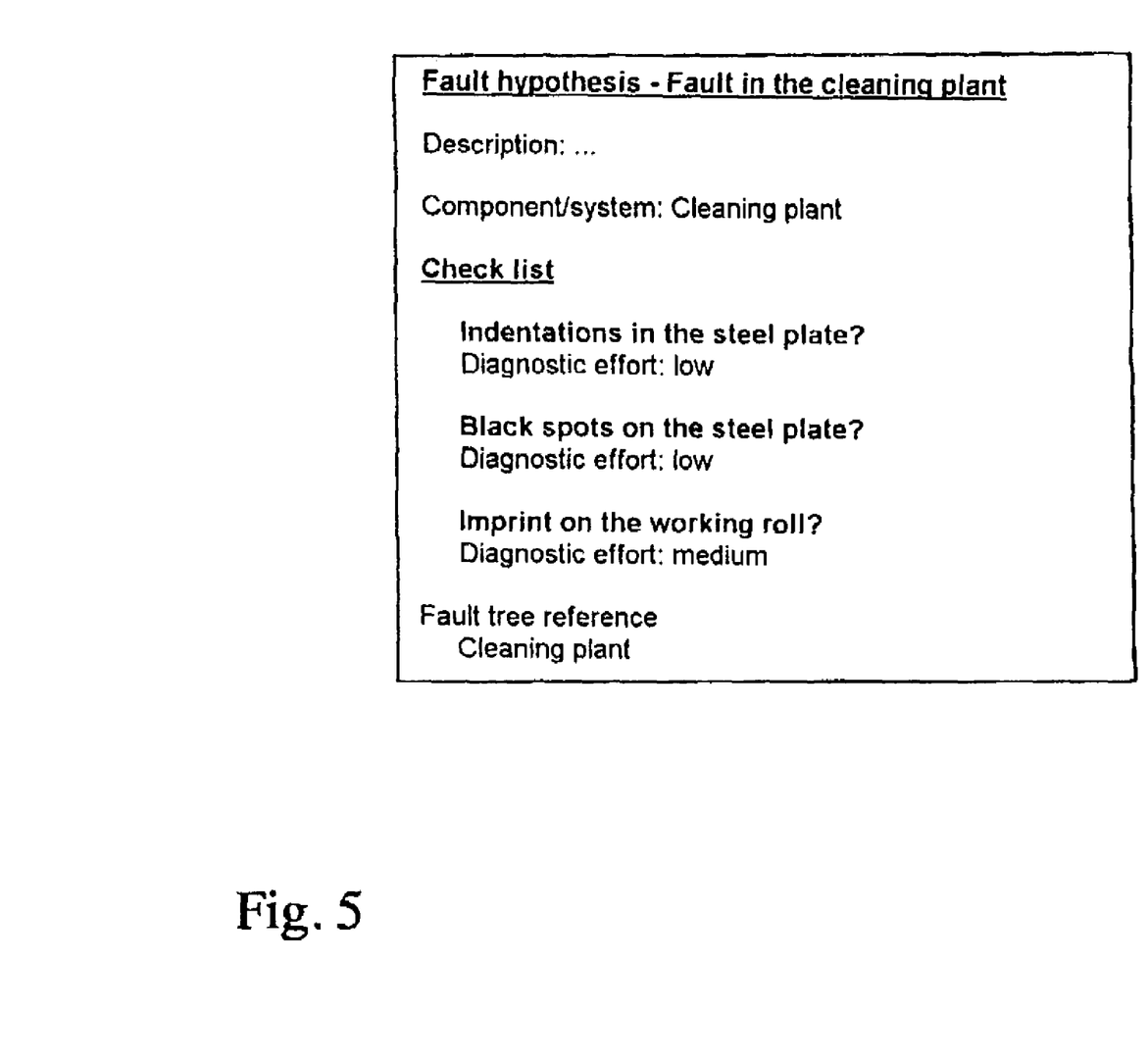
FIG. 5 is a textual listing of important contents of an exemplary fault hypothesis according to the invention.

FIG. 5 shows the important contents of a fault hypothesis using the example of a cleaning plant for steel plates. The hypothesis contains a description of the fault relationships. In addition, the hypotheses are in each case assigned affected components or plant systems. A checklist in each case supplies criteria relating to how the hypothesis can be verified. For each criterion, the effort for the diagnosis is also specified. The hypothesis can be based on complex, independent fault trees. This reference is found in the fault tree reference.

Figure 6:
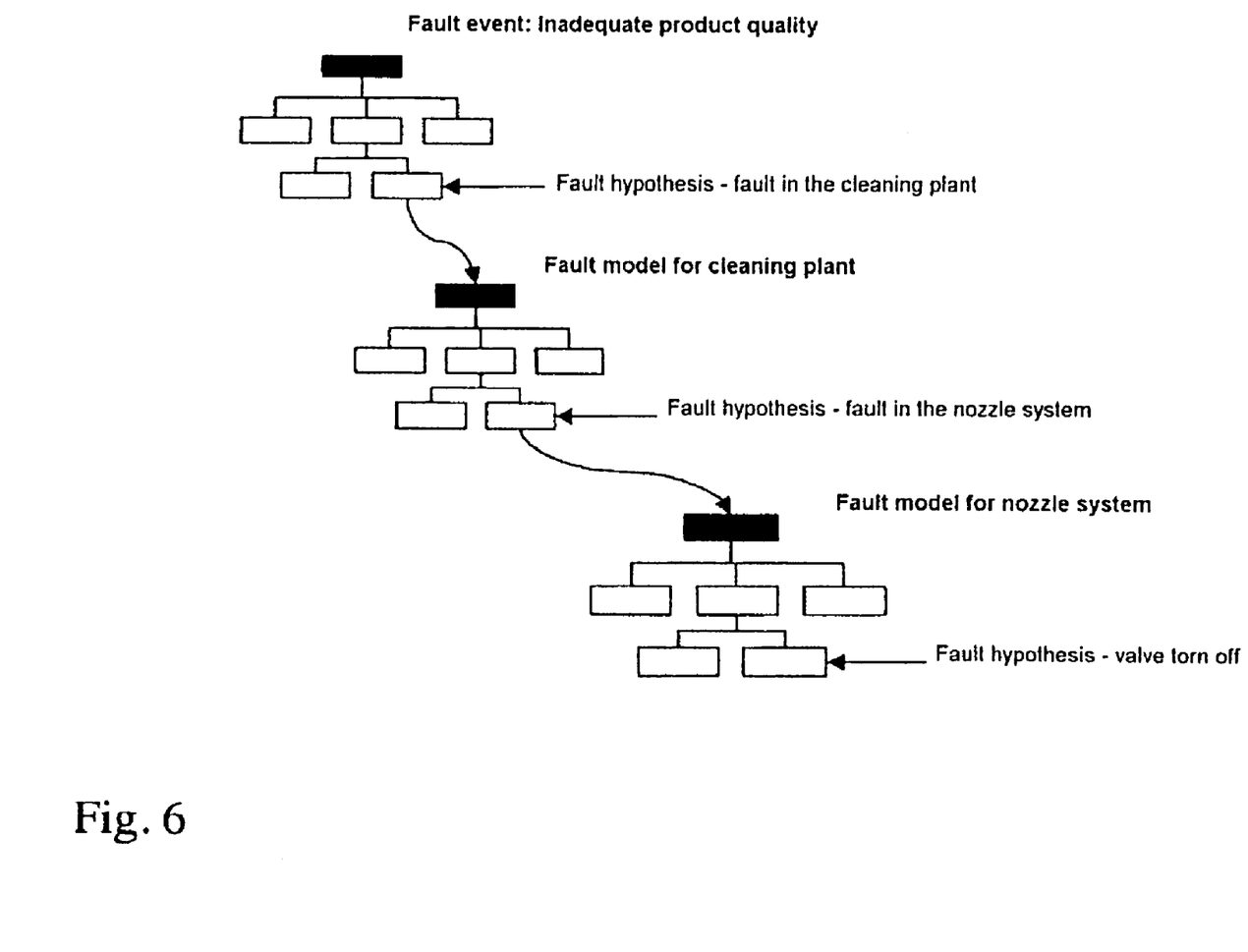
FIG. 6 is a diagrammatic illustration of fault models according to the invention referring to one another.

FIG. 6 shows, by using the fault event example "inadequate product quality," how fault trees refer to one another and how, in this way, complex and comprehensive fault relationships can be modeled.

Figure 7:
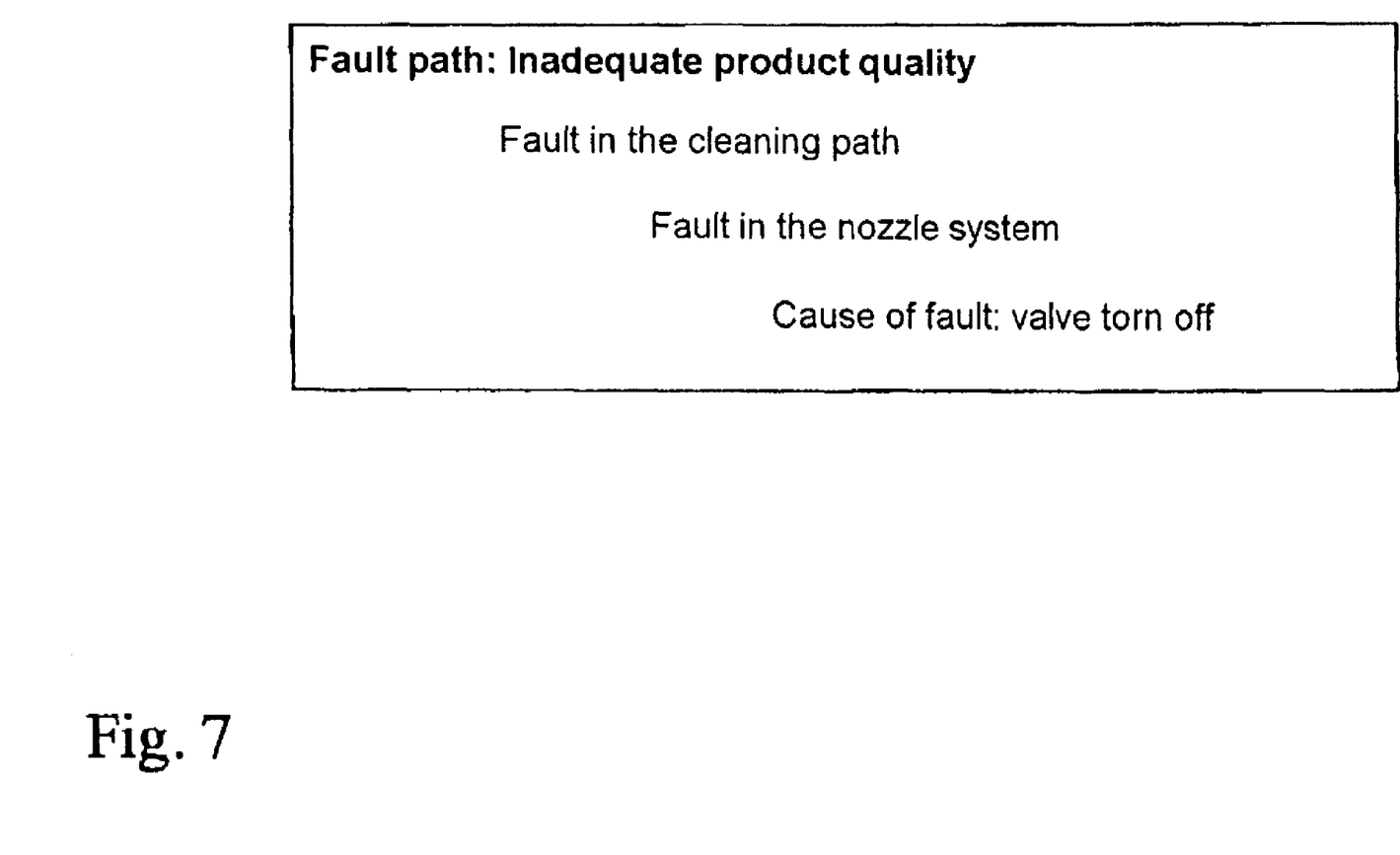
FIG. 7 is a textual listing of a fault path of the embodiment of FIG. 6.

FIG. 7 shows a fault path from the example illustrated in FIG. 6. Such a fault path is the result of the method described for searching and focusing in XML-based models for fault cause analysis.

We claim:

1. A system for supporting a fault cause analysis of a fault event in an industrial plant having plant components and plant systems, comprising:
   an operating and display device for receiving input data and
   displaying output data;
   a fault cause navigator;
   a data processing device having a fault model memory storing at least one hierarchically structured cause/effect model in XML files, said at least one cause/effect model having:
      an industry specific process model divided into process steps, respective ones of said process steps and defined fault events for said process steps being associated with one of the plant components and the plant systems;
      fault trees associated with said fault events having fault hypotheses; and
      a checklist with symptoms for verification of each of said fault hypotheses associated with a respective one of said fault hypotheses;
   said operating and display device and said fault cause navigator connected to said fault model memory and accessing said at least one cause/effect model; and
   said operating and display device, said fault cause navigator, and said data processing device programmed:
      a) to enable user navigation to a relevant one of said process steps in said at least one cause/effect model through said operating and display device and said fault cause navigator, and to present to a user a fault event list;
      b) after selection of a fault event in said fault event list by the user, to find and display critical ones of said plant components and said plant systems corresponding to said selected fault event;
      c) after selection of at least one of said critical plant components and said critical plant systems, to generate possible symptoms and display said symptoms in a checklist; and
      d) after selection of at least one of said symptoms as a probable symptom, to find and display hypotheses of possible fault causes contained in said fault trees.

2. The system according to claim 1, wherein said operating and display device, said fault cause navigator, and said data processing device are programmed, after displaying said hypotheses of possible fault causes contained in said fault trees, to one of:
  enable user confirmation of one of said displayed hypotheses as an actual fault cause; and
  mark a fact that none of said displayed hypotheses has been confirmed by the user; and
if a hypothesis is confirmed as relevant, to generate and output a fault path, and, if no hypothesis is confirmed as relevant, to repeat steps b), c), and d) by finding and displaying other ones of said hypotheses in respective lower levels of at least one cause/effect model and respectively enable user confirmation of one of said displayed hypotheses as an actual fault cause.

3. The system according to claim 1, including a web server administering said XML files and a web browser, said data processing device with said fault model memory being part of said web server, said operating and display device and said fault cause navigator being a web client by which a user accesses said at least one cause/effect model through said web browser and said fault cause navigator.

4. A method for supporting a fault cause analysis of a fault event in an industrial plant having plant components and plant systems, which comprises:
  providing a data processing device with a fault model memory;
  storing in the fault model memory at least one hierarchically structured cause/effect model in the form of XML files, the at least one cause/effect model having:
    an industryspecific process model divided into process steps, respective ones of the process steps and defined fault events for the process steps being associated with one of the plant components and the plant systems;
    fault trees associated with the fault events, the fault trees having fault hypotheses; and
    a checklist with symptoms for verification of each of the fault hypotheses associated with a respective one of the fault hypotheses;
  accessing the at least one cause/effect model through a fault cause navigator and an operating and display device;
  navigating, by a user, to a relevant one of the process steps in the at least one cause/effect model in a first search step through the operating and display device and the fault cause navigator, and presenting the user with a fault event list;
  in a second search step following selection of a fault event in the fault event list by the user, finding and displaying critical ones of the plant components and the plant systems corresponding to the selected fault event;
  in a third search step following selection of at least one of the critical plant components and plant systems, generating possible symptoms and displaying the possible symptoms in a checklist; and
  in a fourth step following selection of at least one of the symptoms as a probable symptom, finding and displaying hypotheses of possible fault causes, the hypotheses contained in the fault trees.

5. The method according to claim 4, which further comprises:
  enabling the user, in a query step following the fourth step, one of:
    to confirm one of the displayed hypotheses as an actual fault cause; and
    to mark a fact that none of the hypotheses has been confirmed;
  if a hypothesis is confirmed as relevant, generating and outputting a fault path; and
  if no hypothesis is confirmed as relevant, performing a repetition of the second to fourth steps to find and display other hypotheses in respective lower levels of at least one cause/effect model and in each case to connect the other hypotheses to the query step.

6. The method according to claim 5, which further comprises:
  providing the data processing device with the fault model memory as part of a web server;
  administering the XML files with the web server;
  configuring the operating and display device and the fault cause navigator as a web client; and
  accessing, through the web client, the at least one cause/effect model through a web browser and the navigator.

7. A method for supporting a fault cause analysis of a fault event in an industrial plant having plant components and plant systems, which comprises:
  providing a data processing device with a fault model memory;
  storing in the fault model memory at least one hierarchically structured cause/effect model in the form of XML files, the at least one cause/effect model having:
    an industryspecific process model divided into process steps, respective ones of the process steps and defined fault events for the process steps being associated with one of the plant components and the plant systems;
    fault trees associated with the fault events, the fault trees having fault hypotheses; and
    a checklist with symptoms for verification of each of the fault hypotheses associated with a respective one of the fault hypotheses;
  accessing the at least one cause/effect model through a fault cause navigator and an operating and display device;
  navigating, by a user, to a relevant one of the process steps in the at least one cause/effect model through the operating and display device and the fault cause navigator, and presenting the user with a fault event list;
  finding and displaying critical ones of the plant components and the plant systems corresponding to the selected fault event;
  generating possible symptoms and displaying the possible symptoms in a checklist; and
  finding and displaying hypotheses of possible fault causes, the hypotheses contained in the fault trees.

8. The according to claim 7, which further comprises:
  enabling the user, in a query step following the step of finding and displaying hypotheses of possible fault causes, one of:
    to confirm one of the displayed hypotheses as an actual fault cause; and
    to mark a fact that none of the hypotheses has been confirmed;
  if a hypothesis is confirmed as relevant, generating and outputting a fault path; and
  if no hypothesis is confirmed as relevant, performing a repetition of the first finding and displaying step, the generating step, and the second finding and displaying step to find and display other hypotheses in respective lower levels of at least one cause/effect model and in each case to connect the other hypotheses to the query step.

9. The method according to claim 8, which further comprises:

providing the data processing device with the fault model memory as part of a web server;

administering the XML files with the web server;

configuring the operating and display device and the fault cause navigator as a web client; and accessing, through the web client, the at least one cause/effect model through a web browser and the navigator.

* * * * *